United States Patent
Gomez

[11] 3,766,652
[45] Oct. 23, 1973

[54] TRIGONOMETRIC AID
[75] Inventor: Arthur L. Gomez, Rowland Heights, Calif.
[73] Assignee: The Raymond Lee Organization, Inc., New York, N.Y.
[22] Filed: Apr. 5, 1972
[21] Appl. No.: 241,220

[52] U.S. Cl. .................................. 33/97, 235/61 GM
[51] Int. Cl. ............................. B43l 7/06, G01b 5/00
[58] Field of Search ..................... 235/61 GM, 61 B; 35/34; 33/97, 94

[56] References Cited
UNITED STATES PATENTS
| 754,086 | 3/1904 | Nichols | 33/97 |
| 2,300,401 | 11/1942 | Basler et al. | 33/97 |
| 3,339,838 | 9/1967 | Skuderna | 235/61 GM |

Primary Examiner—Stephen J. Tomsky
Attorney—Howard I. Podell

[57] ABSTRACT

A nomographic device for determining the solution of problems involving the length of the sides and hypotenuse of right triangles and the size of angles between said sides and the hypotenuse, consisting of a transparent chart board, the axes of which are scaled, with a pivoted arm rotatable about an angle scale. The angle scale is marked in degrees of the angle of said arm with relation to the rectilinear coordinates of the chart board. Two independent transparent slide indicators are mounted below the chart board one of which slides in the horizontal direction and is marked with an opaque vertical indicating line, the other of which slides in the vertical direction and is marked with an opaque horizontal line. The vertical and horizontal axes of the chart board, and the length of the pivoted arm, are marked in units of various multiples.

3 Claims, 5 Drawing Figures

PATENTED OCT 23 1973 3,766,652

3,766,652

TRIGONOMETRIC AID

SUMMARY OF THE INVENTION

This invention relates to a nomographic device for the solution of trigonometric problems.

An object of this device is to furnish the necessary information regarding the length of a side of hypotenuse or size of an angle of a right triangle.

An advantage of this device is its simplicity and adaptability for use in assisting in the instruction of such trigonometric relations.

The device consists of a transparent chart board, the axes of which are marked with a horizontal and a vertical scale, in units of various multiples. A transparent pivoted arm, marked in units of the same multiples, mounted above the board may rotate over an angle of 90°, indicating on the angle at which it is set a circular scale marked on the board. Transparent horizontal and vertical slidable members are mounted below the marked board adaptable to vindicate, respectively, the vertical and the horizontal coordinates of the hypotenuse of the triangle, determined by the setting of the pivoted arm member.

BRIEF DESCRIPTION OF THE DRAWING

The objects and features of the invention may be understood with reference to the following detailed description of an illustrative embodiment of the invention, taken together with the accompanying drawing in which.

DESCRIPTION OF THE PREFERRED EMBODIMENT

Figure 1:
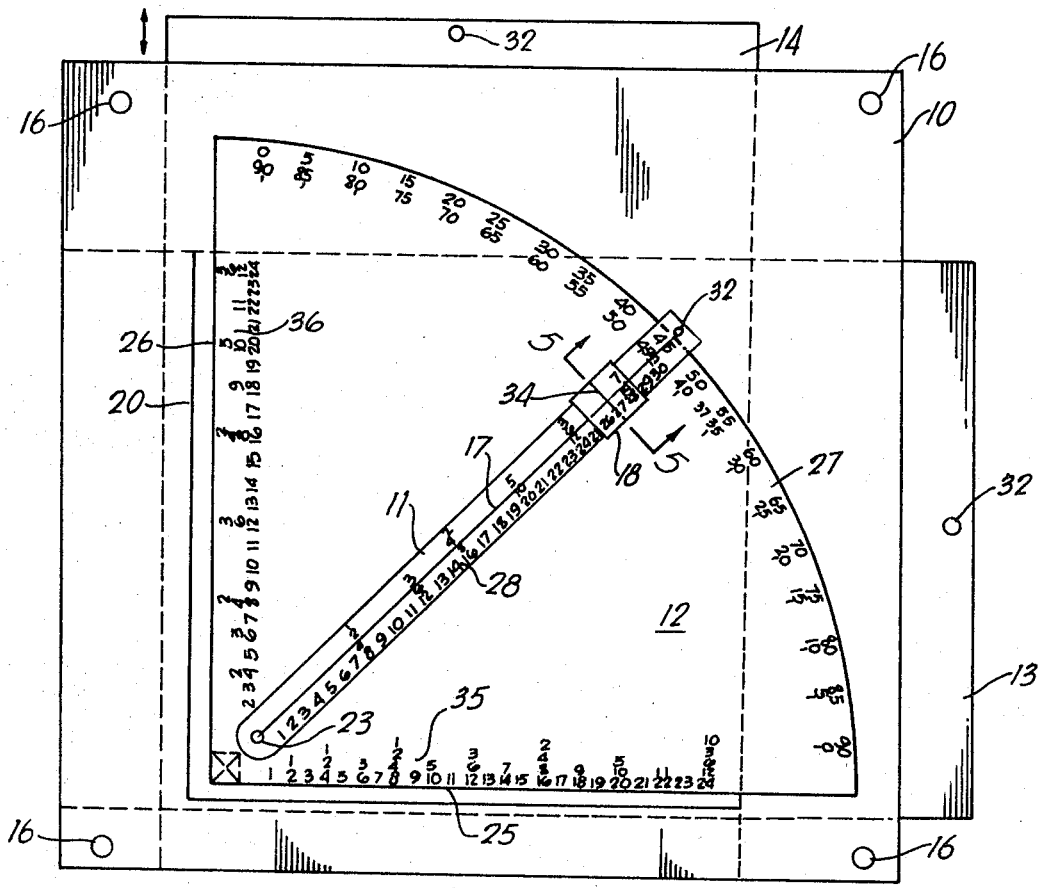
FIG. 1 is a plan view of the device.
Figure 2:
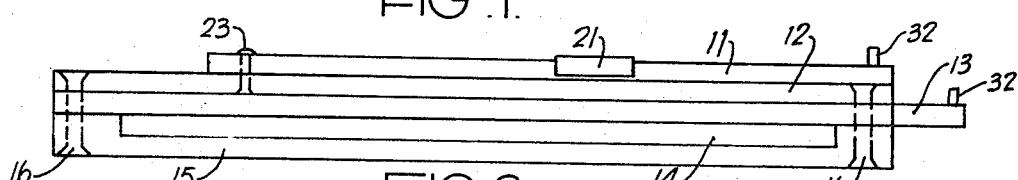
FIG. 2 is a side view of the device.

Turning now descriptively to the drawing, in which similar reference characters denote similar elements throughout the several views, FIG. 1 and FIG. 2 illustrate the device, 10.

The horizontal axis 25 and the vertical axis 26 of transparent chart board 12 are marked with scales 35 and 36 respectively in units of various multiples, with full scale ranging from 3 units to 24 units in the preferred embodiment.

Figures 4, 5:
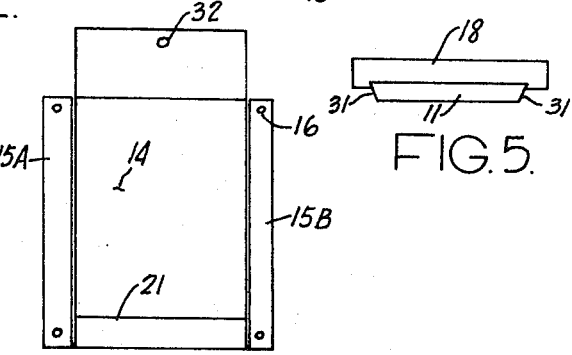
FIG. 4 is a plan view of the vertical alide.
FIG. 5 is an end view of the slidable cursor on the pivoted arm member.

Angle indicating arm 11 similarly is pivotably mounted about rivet 23 being marked with scale 28 along its length, and with opaque indicating line 17. The angle indicating arm 11 has a transparent sliding cursor 18, with an opaque cross-line 34 which is mounted as shown in FIG. 5 above the arm 11, and mates with the undercut sides 31 of angle indicating arm 11. The chart board 12 is marked with a protractor scale 27 to indicate the angle of angle indicating arm 11 with both the horizontal 25 and the vertical 26 axes. For convenience, a peg 32 projects above the end of angle indicating arm 11, to assist in its setting.

Figure 3:
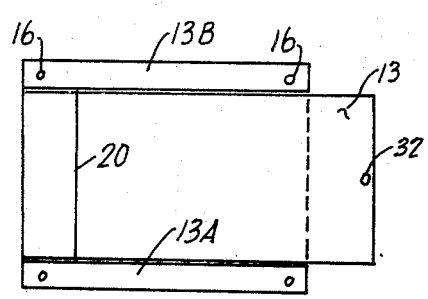
FIG. 3 is a plan view of the horizontal alide.

Directly below the transparent chart board 12 is mounted a transparent horizontal slide 13 which is marked with an opaque vertical indicating line 20. As shown in FIG. 3 horizontal slide 13 is restrained from vertical movement by transparent spacer pieces 13A and 13B. Vertical slide 14 is mounted below the horizontal alide 13, and is marked with a horizontal indicating line 21. As shown in FIG. 4 vertical slide 14 is restrained from horizontal motion by spacer pieces 15A and 15B which project above base 15. Projecting pegs 32 are mounted to horizontal alide 13 and vertical slide 14 to assist in their movement. The assembly of the chart board 12, space pieces 13A and 13B and base 15 is fastened together by means of flush rivets 16.

As an example of the preferred means of operation, the device may be described in use in solving the problem of determining the hypotenuse and base angles of a right triangle with a base of 3 units and an altitude of 4 units. Horizontal slide 13 is moved until its vertical indicator line 20 is underneath the horizontal scale 35 marking of "3," and vertical slide 14 is moved until its horizontal indicator line 21 is directly below vertical scale 36 marking of "4." Angle indicating arm 11 is rotated until its indicating line 17 crosses the intersection of the horizontal indicating line 21 and the vertical indicating line 20, and sliding cursor 18 is moved along angle indicating arm 11 until its indicating line 34 crosses the intersection of the other indicating lines. The indicating line 34 on sliding cursor 18 indicates on the scale 28 of angle indicating arm 11 a hypotenuse of "5," "10," or "20," with the indication of "5" corresponding to the scale selected originally on the horizontal and vertical chart board scales 35 and 36. The indicating line 17 on angle indicating line will also indicate the base angles of the triangle to be approximately 37° and 53° respectively.

Since obvious changes may be made in the specific embodiment of the invention described herein, it is indicated that all matter contained herein is intended as illustrative and not as limiting in scope.

I claim:

1. A nomographic device for determining the solutions of trigonometric problems involving the length of the sides and the hypotenuse of right triangles, and the magnitude of the base angles of such triangles consisting of a transparent chart board and having a horizontal and a vertical scale and a protractor scale, and fitted with a first and a second transparent sliding member, a transparent angle-indicating arm, rotatably riveted to the chart board at a zero position of the chart board, the first transparent sliding member fastened below the chart board by slide guides such that the first sliding member may freely slide parallel to the horizontal axis of the chart board and the second transparent sliding member fastened below the chart board and below the first sliding member by slide guides permitting the second sliding member to freely slide parallel to the vertical axis of the chart board, with a marking on the first sliding member indicating a line parallel to the vertical axis of the chart board and marking the distance along said line parallel to the vertical axis of the chart board from the zero position of the chart board, with a scale marking on the second sliding member indicating a line parallel to the horizontal axis of the chart board and marking the distance along the horizontal axis of the chart board from the zero position of the chart board, together with a transparent cursor member slidably mounted to the arm of the angle-indicating arm, said angle-indicating arm being marked along its length with a scale, indicating the distance along the axis of the arm from the zero position of the chart board.

2. The combination as recited in claim 1 in which an opaque indicating line is marked on the angle-indicating arm parallel to the axis of said arm with said indicating line serving to indicate, against the protractor scale marked on the chart board, the angle at which the angle-indicating arm is set with regard to the horizontal and vertical axes of the chart board, said opaque line also serving to indicate the alignment of the axis of the angle-indicating arm with the intersection of the markings on the first and the second sliding members positioned below the said opaque line on the angle-indicating arm.

3. The combination as recited in claim 2 in which the scale markings of all length scales on the chart board and on the angle-indicating arm are in similar units of length.

* * * * *